United States Patent
Ray

(10) Patent No.: US 8,738,659 B1
(45) Date of Patent: May 27, 2014

(54) METHOD AND APPARATUS FOR MANAGING PRIORITY IN STANDARDIZED TEST AND SURVEY IMAGING

(75) Inventor: Damon E. Ray, New Hope, MN (US)

(73) Assignee: Data Recognition Corporation, Maple Grove, MN (US)

( * ) Notice: Subject to any disclaimer, the term of this patent is extended or adjusted under 35 U.S.C. 154(b) by 1241 days.

(21) Appl. No.: 12/256,303

(22) Filed: Oct. 22, 2008

Related U.S. Application Data

(60) Provisional application No. 60/981,741, filed on Oct. 22, 2007, provisional application No. 60/981,745, filed on Oct. 22, 2007.

(51) Int. Cl.
*G06F 7/00* (2006.01)
*G06F 17/30* (2006.01)

(52) U.S. Cl.
USPC ........................................................ 707/802

(58) Field of Classification Search
USPC ........................................................ 707/802
See application file for complete search history.

(56) References Cited

U.S. PATENT DOCUMENTS

| | | | |
|---|---|---|---|
| 4,813,077 A | 3/1989 | Woods et al. | |
| 4,817,179 A | 3/1989 | Buck | |
| 4,827,330 A | 5/1989 | Walsh et al. | |
| 4,837,842 A | 6/1989 | Holt | |
| 4,967,354 A | 10/1990 | Buchanan | |
| 4,978,305 A | 12/1990 | Kraft | |
| 5,001,769 A | 3/1991 | Reid-Green et al. | |
| 5,004,896 A | 4/1991 | Serrell et al. | |
| 5,041,874 A | 8/1991 | Nishimori et al. | |
| 5,194,966 A | 3/1993 | Quardt et al. | |
| 5,321,611 A | 6/1994 | Clark et al. | |
| 5,363,318 A | 11/1994 | McCauley | |
| 5,433,615 A | 7/1995 | Clark | |
| 5,452,379 A | 9/1995 | Poor | |
| 5,466,159 A * | 11/1995 | Clark et al. | 434/322 |
| 5,557,515 A | 9/1996 | Abbruzzese et al. | |
| 5,672,060 A | 9/1997 | Poor | |
| 5,735,694 A | 4/1998 | Clark et al. | |
| 5,825,947 A | 10/1998 | Sasaki et al. | |
| 5,832,100 A | 11/1998 | Lawton et al. | |

(Continued)

FOREIGN PATENT DOCUMENTS

EP      0 374 892 B1    4/1997

OTHER PUBLICATIONS

""Score Image" Processing of Constructed-Responses, Essays, and Writing Samples", *UNISCORE, Incorporated*, (1992), 3 pgs.

(Continued)

*Primary Examiner* — Kuen Lu
(74) *Attorney, Agent, or Firm* — Schwegman Lundberg & Woessner, P.A.

(57) ABSTRACT

Disclosed herein, among other things, are method and apparatus for managing priority in a standardized test and survey imaging system. In various embodiments, a batch code is associated with a batch of documents, and a material code and a return-type code are associated with each document of the batch. A prioritization strength is automatically assigned to each document based on the material code and the return-type code, and a prioritization strength is automatically assigned to the batch as a function of the prioritization strengths of the documents in the batch. The batch is processed using a computer as a function of the prioritization strength of the batch.

21 Claims, 5 Drawing Sheets

(56) References Cited

U.S. PATENT DOCUMENTS

| | | | |
|---|---|---|---|
| 5,907,742 A | 5/1999 | Johnson et al. |
| 5,987,149 A | 11/1999 | Poor |
| 5,987,302 A | 11/1999 | Driscoll et al. |
| 6,141,120 A | 10/2000 | Falk |
| 6,173,154 B1 | 1/2001 | Kucinski et al. |
| 6,183,261 B1 | 2/2001 | Clark et al. |
| 6,204,873 B1 | 3/2001 | Shimazaki |
| 6,256,111 B1 | 7/2001 | Rijavec |
| 6,321,052 B1 | 11/2001 | Yamashina et al. |
| 6,366,759 B1 | 4/2002 | Burstein et al. |
| 6,404,517 B1 | 6/2002 | Chao |
| 6,459,509 B1 | 10/2002 | Maciey et al. |
| 6,471,352 B2 | 10/2002 | Akahira |
| 6,526,258 B2 | 2/2003 | Bejar et al. |
| 6,532,026 B2 | 3/2003 | Takahashi et al. |
| 6,645,029 B2 | 11/2003 | Akahira |
| 6,714,321 B2 | 3/2004 | Rao et al. |
| 6,832,825 B1 | 12/2004 | Nishikori et al. |
| 6,947,571 B1 | 9/2005 | Rhoads et al. |
| 7,027,187 B1 | 4/2006 | Zuber |
| 7,084,998 B2 | 8/2006 | Blair et al. |
| 7,162,198 B2 | 1/2007 | Kuntz et al. |
| 7,295,340 B2 | 11/2007 | Mestha et al. |
| 7,406,392 B2 | 7/2008 | Gedlinske et al. |
| 7,411,688 B1 | 8/2008 | Zhai et al. |
| 7,474,783 B2 | 1/2009 | Sharma et al. |
| 7,505,173 B2 | 3/2009 | Viturro et al. |
| 7,516,895 B2 * | 4/2009 | Holoubek ............... 235/462.01 |
| 7,573,616 B2 | 8/2009 | Poor |
| 7,692,832 B2 | 4/2010 | Klassen |
| 7,697,166 B2 | 4/2010 | Bray |
| 7,742,991 B2 | 6/2010 | Salzmann et al. |
| 7,831,195 B2 | 11/2010 | Borchers |
| 7,835,043 B2 | 11/2010 | Gila et al. |
| 7,992,953 B2 | 8/2011 | Yorimoto et al. |
| 8,102,412 B2 | 1/2012 | Klemer et al. |
| 2001/0028916 A1 | 10/2001 | Akahira |
| 2001/0040979 A1 | 11/2001 | Davidson et al. |
| 2002/0054384 A1 | 5/2002 | Motamed |
| 2002/0126172 A1 | 9/2002 | Akiyama |
| 2002/0161772 A1 | 10/2002 | Bergelson et al. |
| 2003/0016263 A1 | 1/2003 | Takahashi et al. |
| 2003/0118976 A1 | 6/2003 | Makishima et al. |
| 2003/0126001 A1 * | 7/2003 | Northcutt et al. ................. 705/8 |
| 2003/0202029 A1 | 10/2003 | Bronswijk et al. |
| 2004/0117617 A1 | 6/2004 | Geller et al. |
| 2004/0130739 A1 | 7/2004 | Adam et al. |
| 2004/0131279 A1 | 7/2004 | Poor |
| 2004/0264771 A1 | 12/2004 | Sharma et al. |
| 2005/0024410 A1 | 2/2005 | Subirada et al. |
| 2005/0094170 A1 | 5/2005 | Ichitani |
| 2005/0172226 A1 * | 8/2005 | Kobashi et al. ............... 715/518 |
| 2005/0206982 A1 | 9/2005 | Hattori |
| 2005/0213790 A1 | 9/2005 | Rhoads et al. |
| 2006/0077407 A1 | 4/2006 | Tanaka |
| 2006/0193017 A1 | 8/2006 | Zuber |
| 2006/0195508 A1 * | 8/2006 | Bernardin et al. ............ 709/203 |
| 2006/0227386 A1 | 10/2006 | Nuuja et al. |
| 2006/0288279 A1 | 12/2006 | Yacoub et al. |
| 2007/0024928 A1 | 2/2007 | Ono |
| 2007/0201112 A1 | 8/2007 | Motamed |
| 2008/0080027 A1 | 4/2008 | Mestha et al. |
| 2008/0152371 A1 | 6/2008 | Burry et al. |
| 2008/0225067 A1 | 9/2008 | Morino et al. |
| 2008/0316552 A1 | 12/2008 | Poor |
| 2009/0059321 A1 | 3/2009 | Buckley et al. |
| 2009/0086230 A1 | 4/2009 | Reed |
| 2010/0231728 A1 | 9/2010 | Holub |
| 2010/0284041 A1 | 11/2010 | Warnes |

OTHER PUBLICATIONS

"Image Processing of Open-Ended Questions", *UNISCORE, Incorporated*, (1992), 4 pgs.

Cason, Gerald J, et al., "Integrated Test Scoring, Performance Rating and Assessment Records Keeping", *Innovations in Medical Education, Association of American Medical Colleges*, Washington, D.C.., Paper presented at the annual meeting of the Association of Medical Colleges., (Nov. 1, 1987), 2-20.

Gathy, P, et al., "Computer-Assisted Self-Assessment (CASA) in Histology", *Computers Education.*, vol. 17, No. 2., (1991), 109-116.

Reid-Green, Keith S, "A High Speed Image Processing System [Journal Paper]", *IMC Journal*, vol. 26, No. 2, March-April, USA, (1990), 12-14.

Zuckerman, Ronald A, "Optical Scanning for Data Collection, Conversion & Reduction", *NTIS, U.S. Department of Commerce, National Technical Information Service*, August, Springfield, VA, USA, (1967), 49 pgs.

"U.S. Appl. No. 12/256,317, Non Final Office Action mailed Oct. 7, 2011", 10 pgs.

"U.S. Appl. No. 12/256,282, Non Final Office Action mailed Jan. 4, 2012", 12 pgs.

"U.S. Appl. No. 12/256,317 , Response filed Feb. 7, 2012 to Non Final Office Action mailed Oct. 7, 2011", 8 pgs.

"U.S. Appl. No. 12/256,317, Notice of Allowance mailed Mar. 2, 2012", 11 pgs.

"U.S. Appl. No. 12/256,339, Non Final Office Action mailed Jan. 10, 2012", 13pgs.

"U.S. Appl. No. 12/256,354, Non Final Office Action maied Mar. 1, 2012", 8 pgs.

"U.S. Appl. No. 12/256,354, Restriction Requirement mailed Nov. 21, 2011", 8 pgs.

"U.S. Appl. No. 12/256,282, Final Office Action mailed Aug. 6, 2012", 13 pgs.

"U.S.Appl. No. 12/256,282, Response filed Apr. 4, 2012 to Non Final Office Action mailed Jan. 4, 2012", 7 pgs.

"U.S. Appl. No. 12/256,339, Final Office Action mailed Sep. 7, 2012", 15 pgs.

"U.S. Appl. No. 12/256,339, Response filed Apr. 10, 2012 to Non Final Office Action mailed Jan. 10, 2012", 7 pgs.

"U.S. Appl. No. 12/256,354, Notice of Allowance mailed Oct. 5, 2012", 7 pgs.

"U.S. Appl. No. 12/256,354, Response filed Aug. 1, 2012 to Non Final Office Action mailed Mar. 1, 2012", 7 pgs.

\* cited by examiner

Image Ops Navigation

File  Help

Unassigned Materials (defined by Return Types)

| PROJECT | MATERIAL DESCRIPTION | FORM NUMBER | RETURN TYPE |
|---|---|---|---|
| 505222 | GRADE 5 MATH & ELA FORM 001 | 001 | REGULAR |
| 505222 | GRADE 5 MATH & ELA FORM 002 | 002 | REGULAR |
| 505333 | GRADE 5 MATH & ELA FORM 001 | 001 | REGULAR |
| 505333 | GRADE 5 MATH & ELA FORM 002 | 002 | REGULAR |
| 505444 | GRADE 5 MATH & ELA FORM 001 | 001 | REGULAR |
| 505444 | GRADE 5 MATH & ELA FORM 002 | 002 | REGULAR |
| 505555 | GRADE 5 MATH & ELA FORM 001 | 001 | REGULAR |
| 505555 | GRADE 5 MATH & ELA FORM 002 | 002 | REGULAR |
| 505666 | GRADE 5 MATH & ELA FORM 001 | 001 | REGULAR |
| 505666 | GRADE 5 MATH & ELA FORM 002 | 002 | REGULAR |
| 505888 | GRADE 5 MATH & ELA FORM 001 | 001 | REGULAR |
| 505888 | GRADE 5 MATH & ELA FORM 002 | 002 | REGULAR |
| 511111 | GRADE 3 ReadWriMath FORM 001 | 001 | REGULAR |
| 511111 | GRADE 3 ReadWriMath FORM 002 | 002 | REGULAR |
| 520005 | GRADE 7 MATH & ELA FORM 001 | 001 | REGULAR |
| 520005 | GRADE 7 MATH & ELA FORM 002 | 002 | REGULAR |
| 525525 | GRADE 7 MATH & ELA FORM 001 | 001 | REGULAR |
| 525525 | GRADE 7 MATH & ELA FORM 002 | 002 | REGULAR |
| 575123 | GRADE 5 MATH & ELA FORM 001 | 001 | REGULAR |
| 575123 | GRADE 5 MATH & ELA FORM 002 | 002 | REGULAR |
| 575456 | GRADE 5 MATH & ELA FORM 001 | 001 | REGULAR |
| 575456 | GRADE 5 MATH & ELA FORM 002 | 002 | REGULAR |

320 ← 310 ← 315 ← 305

Priority Ranking Groups

[ADD NEW GROUP]

PROJECT / GROUP NAME / EXPIRATION DATE / MEMBERS

[OPEN GROUP]  [ADD GROUP]  [REMOVE GROUP]

[EXIT]

FIG. 3

METHOD AND APPARATUS FOR MANAGING PRIORITY IN STANDARDIZED TEST AND SURVEY IMAGING

CROSS-REFERENCE TO RELATED APPLICATIONS

This application claims the benefit of provisional U.S. patent application Ser. No. 60/981,741, filed on Oct. 22, 2007, and provisional U.S. patent application Ser. No. 60/981,745, filed on Oct. 22, 2007, which are hereby incorporated by reference in their entirety.

TECHNICAL FIELD

This disclosure relates generally to method and apparatus for managing priority for scanned documents, and more particularly to method and apparatus for managing priority in standardized test and survey imaging.

BACKGROUND

One method for evaluating the knowledge or skill of a person includes the use of standardized tests. For example, standardized tests are used to monitor the academic progress of students. Some standardized tests incorporate objective test questions that are answered by filling in an appropriate oval in an associated bubble-type answer sheet using a pencil. Some standardized tests include open-ended questions or tests. Examples of open-ended questions in these tests include essay questions, fill-in-the-blank questions, fill-in-the-map questions, math questions, and motor skill tests in which a test taker draws geometric shapes. Open-ended questions or tests, also referred to herein as scoring tasks or test items, are evaluated and scored by a human reviewer, also referred to herein as a reader.

Standardized tests are distributed from test processing centers to test-taking centers where the tests are administered to test-takers. One example of a test-taker is a student. Another example of a test-taker is a student who is taking home-based assessments.

In order to promote the integrity and accuracy of the administered tests and test results, it is desirable to properly manage priority of the test items when scanning the completed test, so that objective test items can be properly scored by machine and open-ended test items can be properly scored by readers.

Computer processing systems can operate using a variety of programs across multiple servers to process data and obtain desired outputs. When these systems are large, a management protocol is needed to dedicate available resources for each request for system bandwidth.

Another practice by which information is obtained is a survey. Surveys are used to obtain information from a person, such as a consumer of goods or services. Surveys also use forms having standardized questions. Large amounts of data can be compiled from surveys using standardized forms. Thus, there is a need for accurate collection of data from the standardized forms.

Improved method and apparatus for managing priority in standardized test and survey imaging and for managing batch processing applications are needed.

SUMMARY

The above-mentioned problems and others not expressly discussed herein are addressed by the present subject matter and will be understood by reading and studying this specification.

Disclosed herein, among other things, are method and apparatus for managing priority in standardized test and survey imaging. According to one embodiment, a batch code is associated with a batch of documents, and a material code and a return-type code are associated with each document of the batch. A prioritization strength is automatically assigned to each document based on the material code and the return-type code, and a prioritization strength is automatically assigned to the batch as a function of the prioritization strengths of the documents in the batch. The batch is processed using a computer as a function of the prioritization strength of the batch.

Another aspect of this disclosure includes a method and apparatus for managing batch processing applications. According to one embodiment of a method, a graphical operating interface is provided for controlling a plurality of applications for batch processing of standardized test results. A request from a user is received for controlling processing of the standardized test results using the interface. The standardized test results are processed using a computer, and a database is created of results from the processing. According to various embodiments, the interface provides monitoring and reporting of status of at least one of the applications, and the interface also provides one or more of initiating, stopping or pausing the at least one application.

Another aspect of this disclosure includes a method and apparatus for managing priority and batch processing in standardized test and survey imaging. According to one embodiment of a method, a graphical operating interface is provided for controlling a plurality of applications for batch processing of standardized test results. A request from a user is received for controlling processing of the standardized test results using the interface. The standardized test results are processed using a computer, and a database is created of results from the processing. The interface provides monitoring and reporting of status of the application, and the interface also provides one or more of initiating, stopping or pausing the application. According to various embodiments, creating the database includes associating a batch code with a batch of documents and a material code and a return-type code with each document of the batch, automatically assigning a prioritization strength to each document based on the material code and the return-type code, and processing the batch as a function of the prioritization strength of the batch.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 3 illustrates a screen image of an embodiment of a system for managing priority and batch processing in standardized test and survey imaging.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter generally relates to method and apparatus for managing priority for scanned documents, and more particularly to method and apparatus for managing priority in standardized test and survey imaging. The priority manager application is a preliminary or "setup" application to the main scanning application, and defines process priorities based on priority ranking of material and return type that has different priorities than the order of scanning (processing math questions first, for example). The priority manager application defines batches, documents and items based on priorities in real time. Providing a preliminary priority management tool provides readers and graders with information in the proper sequence. For each batch, the priority manager looks at the priority of each document within a batch, and assigns to the batch the priority of the highest priority document in the batch, in an embodiment. A document can be a test answer book, in an embodiment. A batch includes a box of materials identified by six digits of the box barcode and processed through the imaging system as a single entity, in an embodiment. Materials can be the same grade, subject and form or a mixed selection of grade, subject and form, in various embodiments.

Figure 1:
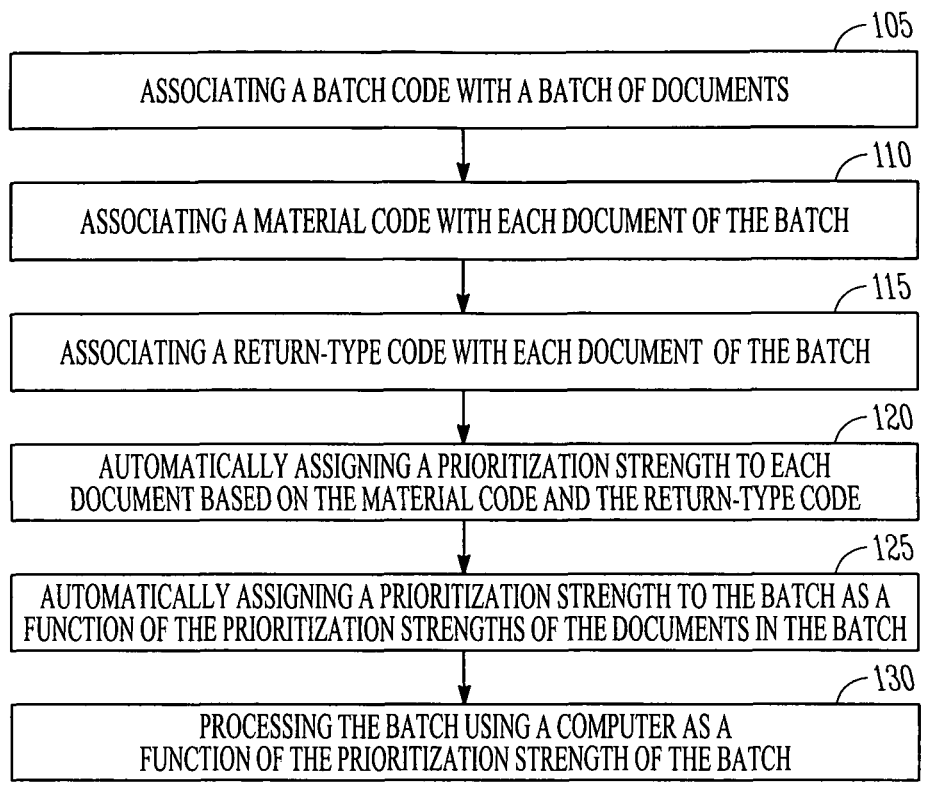
FIG. 1 illustrates a flow diagram of an embodiment of a method for managing priority in standardized test imaging.

FIG. 1 illustrates a flow diagram of an embodiment of a method for managing priority in standardized test and survey imaging. According to an embodiment, a batch code is associated with a batch of documents, at 105, and a material code, at 110, and a return-type code, at 115, are associated with each document of the batch. At 120, a prioritization strength is automatically assigned to each document based on the material code and the return-type code, and at 125, a prioritization strength is automatically assigned to the batch as a function of the prioritization strengths of the documents in the batch. The batch is processed using a computer, as a function of the prioritization strength of the batch, at 130. According to various embodiments, processing using a computer includes processing using a computer, server and/or program.

According to various embodiments, each batch includes a date code, and batches of equal prioritization are processed by the date code associated with the batch. Processing the batch as a function of the prioritization strength includes storing information present in the batch of documents, retrieving the information using the prioritization strength, and providing the information to one or more graders, in various embodiments. In one embodiment, the method further includes storing and/or retrieving information from a computer memory. In various embodiments, graphical interface is provided for monitoring prioritization and/or status of each batch throughout a process, including a depiction of priority and/or status of each batch in the process.

According to various embodiments, the batch code is read from a bar code located on a header sheet. The material code relates to the grade and subject matter of that document, and is read from each document, in an embodiment. The return-type code is defined by a separate shipping and receiving system, in an embodiment. Various embodiments of the present subject matter permit a user to change the return-type code using a graphical interface.

The priority manager application prioritizes different types of materials going through the imaging system. Material can be categorized as regular return and/or early return (return types). If a material is categorized as both a regular return booklet and an early return booklet, it is recognized by the priority manager as having multiple material/return types. A user of the imaging system can rank all active material/return types against one another for all active projects in the system. The priority manager system allows a user to set up groups of material/return types for processing, as multiple materials can have the same processing requirements. The user can then adjust the rank of each group to be higher, lower or equal to other groups/batches in the system. In addition, the priority manager system allows for material/return types to be allocated to a straggler group, which is given a high priority. As new material/return types are recognized by the system, they are automatically added to the miscellaneous unassigned group until another categorization is identified by the user.

The imaging system permits multiple material types and/or return types to be processed in the same batch. As a batch is added into the imaging system, each booklet in the batch has its material/return type identified. After all booklets are properly identified, the system assigns the batch the highest priority of all of its members. This priority will be used by the system to decide which batch should be processed first by any application that chooses from multiple batches. It can also be used in the sort order of batch listings for user applications, showing the user batches in priority order for them to choose from. Since a group of material/return types can be set to straggler status (aided by the use of an expiration date), any time the system receives a material of that type in a batch, it will push the batch through the system at the highest priority level. If the user chooses, individual batches can also be overridden to the higher or lower priority ranking. If priority rankings are adjusted during processing, the priority manager application will add all new batches after the adjustment using the new rankings. For all active batches, the system will reevaluate the ranking of each batch and will process them according to the newly assigned priority.

FIG. 3 illustrates a screen image of an embodiment of a system for managing priority and batch processing in standardized test and survey imaging. The depicted embodiment shows columns for return type 305, material type 310, form number 315 and project number 320. Other types of document identifying types are used in various embodiments. In an embodiment, a user can select priority ranking groups.

According to various embodiments, the documents include a plurality of test items, each test item including an item code. Setting priorities further includes setting priorities using at least the item code, in an embodiment. Providing information to graders further includes forming a queue of responses for grading based on the priorities, and providing responses for grading to the one or more graders using the queue, in an embodiment.

The method is used to set the priority for scanned material being processed through the imaging system. Based on the assigned priority, imaging system applications process batches containing highest priority material (batches, documents and/or items) first. Priority manager sets priority based on material type. Material types can include, but are not limited to: jurisdiction (e.g. Pennsylvania), grade level (e.g., grade 5), or topic (e.g., science). The method embodiment selects batches, documents, or items that have the selected material type, to improve continuity of grading for readers, as they get all of one type before moving to the next type. Return types can include, but are not limited to: early, regular, senior or straggler. Return types can be used to filter the results to get answers faster of one return type over another. An example of an early return type includes a set of documents from one group used to project how others will do on a particular exam, as in a psychometric example. Changes in priority will change priority across every job in the imaging system, in an embodiment. Every job that is interrupted will be reprioritized. If a problem is found in editing, the problem can be corrected and restarted from the point of interruption. Thus, it is possible to re-enter at intermediate stages by documenting status.

In one example, two batches have the following contents:

| BATCH 001 | Material | Return | Priority |
|---|---|---|---|
| Doc1 - | 3M | Early | 40 |
| Doc2 - | 4S | Early | 30 |
| Doc3 - | 3M | Early | 40 |
| BATCH 002 | Material | Return | Priority |
| Doc1 - | 4S | Reg | 50 |
| Doc2 - | 4S | Reg | 50 |
| Doc3 - | 4S | Reg | 50 |
| Doc4 - | 4S | Reg | 50 |

Batch 001 will have a priority of 30, based on document 2 (its highest priority document), and batch 002 will have a priority of 50. Thus, batch 001 would have the highest priority and be processed before batch 002 in this embodiment; because it has the highest priority (lower numbers correspond to higher priorities in this example). If two batches have the same priority, the batches would be processed in a first in, first out order, in various embodiments. The above example uses numeric values for priority. However, other indications of priority level are possible without departing form the scope of this disclosure. For example, priority may be designated by terms such as "high", "medium" and "low."

Figure 2:
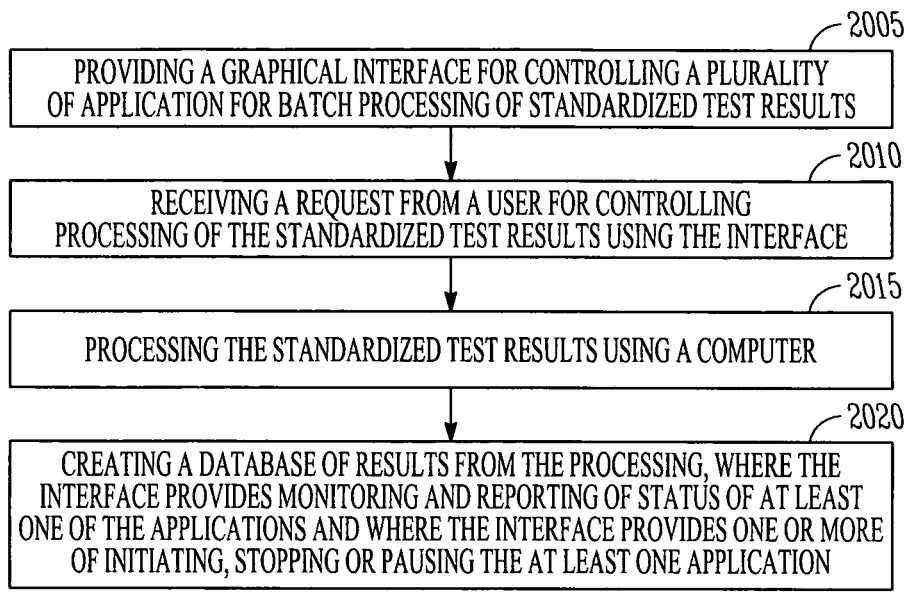
FIG. 2 illustrates a flow diagram of an embodiment of a method for managing batch processing applications.

FIG. 2 illustrates a flow diagram of an embodiment of a method for managing batch processing applications. According to one embodiment of a method, a graphical operating interface is provided for controlling a plurality of applications for batch processing of standardized test results, at 2005. A request from a user is received for controlling processing of the standardized test results using the interface, at 2010. The standardized test results are processed using a computer, at 2015, and a database is created of results from the processing, at 2020. According to various embodiments, the interface provides monitoring and reporting of status of at least one of the applications, and the interface also provides one or more of initiating, stopping or pausing the at least one application.

In one embodiment, the interface is used to select a server from a plurality of servers to perform the processing. The plurality of applications includes a scan quality exporter application, in one embodiment. In various embodiments, the plurality of applications can include an image mark recognition scoring engine (IMRSE) application, an instance build application, a calibration facilitator application, and/or an image purge and archive application.

The system for managing batch processing applications is referred to as a Service Manager application. The Service Manager application retrieves priority information, generated by the Priority Manager application described above, from a database and makes assignments based on the priority. Multiple applications run under the authority of the Service Manager. The Service Manager determines what data should be processed and which available computer resources (machines or servers) should do the processing. The Service Manager has the ability to turn on and off remote machines without having to send a person to the machine location. According to various embodiments, assignments are broken into units and distributed based upon the priority of the assignment, the priority of assignments particular to a machine, and by the total units for each application. Once the application with the greatest units is determined the top unit of assignments is selected for that application based on priority of the assignment and machine. The assignment is then given a machine identification which removes it from the pool of assignments available for distribution. Thus, available assignments for each application are proportional and all types of assignments are equally processed. Each server (or machine) runs the Service Manager application, which pulls assignments from the available ones as needed, updates the status, distributes each assignment to a service application for processing, and further updates the status. If the assignment allocation finds no available assignments, the service sleeps a progressively longer period of time (up to a user definable maximum), and then tries again.

In one embodiment, the Service Manager manages a system for scanning or imaging standardized tests for scoring. In this embodiment, available applications running under the authority of the Service Manager include, but are not limited to: scan quality exporter, image mark recognition and scoring engine (IMRSE), instance build, calibration facilitator and image purge and archive applications.

The Service Manager provides a windows-based interactive system that allows starting, stopping and pausing of the system applications based on authority. In one embodiment, the Service Manager provides a monitoring function, including providing notification that a particular machine or server is not responding. The machine or server includes a blade server, in an embodiment. The Service Manager operates under one authority and with common reporting and behaviors. An assignment is created in a database by the Service Manager. While any given machine can work on any given process, the Service Manager can customize operations, such as isolating one machine to work on one process. The Service Manager is not blade server specific, and can function with any combination of machines or servers. A user can reset a batch from any step to any previous step, in an embodiment.

Various embodiments include a method and apparatus for managing priority and batch processing in standardized test and survey imaging. According to one embodiment of a method, a graphical operating interface is provided for controlling a plurality of applications for batch processing of standardized test results. A request from a user is received for controlling processing of the standardized test results using the interface. The standardized test results are processed using a computer, and a database is created of results from the processing. The interface provides monitoring and reporting of status of the application, and the interface also provides one or more of initiating, stopping or pausing the application. According to various embodiments, creating the database includes associating a batch code with a batch of documents and a material code and a return-type code with each document of the batch, automatically assigning a prioritization strength to each document based on the material code and the return-type code, and processing the batch as a function of the prioritization strength.

According to various embodiments, a prioritization strength is automatically assigned to the batch as a function of the prioritization strength of at least one document in the batch. A prioritization strength is automatically assigned to the batch as a function of the prioritization strength of each document in the batch, in an embodiment. The interface provides resetting a batch from a step in processing to any previous step in processing, according to various embodiments. Each batch includes a date code and batches of equal prioritization strength are processed by date code, in an embodiment.

Throughout the imaging system, which converts educational assessments from paper format to electronic format, one or more background processes run batches and images. The service manager application assigns tasks to available servers, and can run as a windows service on the servers. The service manager pulls assignments from the database and distributes them to the appropriate service application for processing. Each service application updates the status of the assignment upon start and completion, and passes the assignment off to the next application.

Figure 5:
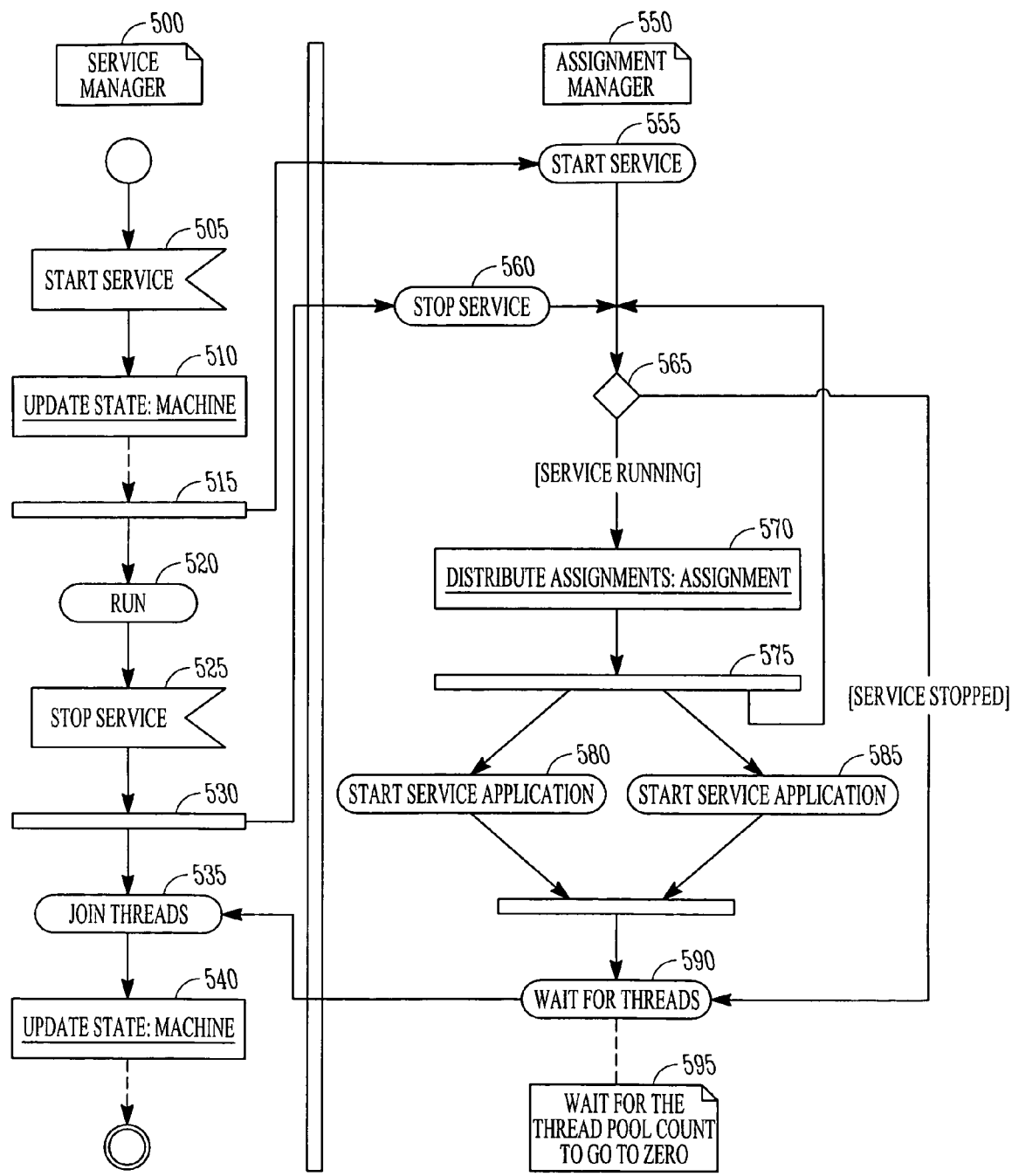
FIG. 5 illustrates a flow diagram of an embodiment of the interaction of the service manager and assignment manager batch processing applications.

FIG. 5 illustrates a flow diagram of an embodiment of the interaction of the service manager 500 and assignment manager 550 batch processing applications. The service manager starts at 505, updates the state of the machine at 510, and then starts application manager at 515. Processes run at 520 and stop at 525, stopping service in the assignment manager at 530. At 535, the service manager joins threads with the assignment manager, and updates state at 540. The assignment manager starts at 555, can stop at 560 or proceed running service at 565 to distribute assignments at 570. At 575, multiple service applications 580, 585 can be started, at 590 the assignment manager waits for threads to join with the service manager, and at 595 waits for the thread pool count to go to zero.

Figure 4:
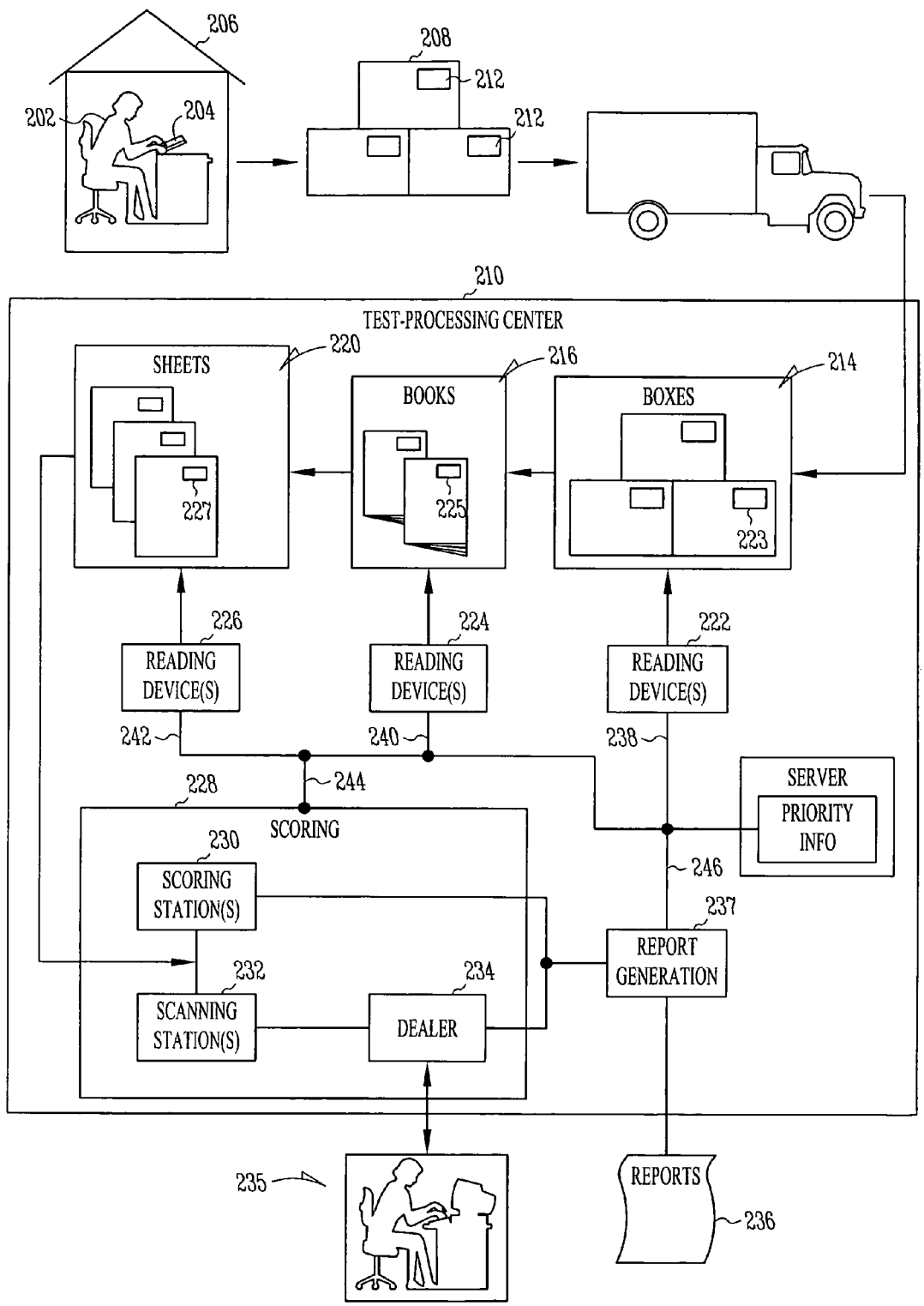
FIG. 4 illustrates a block diagram of an embodiment of an apparatus for processing and scanning documents.

FIG. 4 illustrates a block diagram of an embodiment of an apparatus for processing and scanning documents. The system resides outside the scanning system, and is a setup application used to tell the scanning system how to scan pages of a completed test. In the illustrated embodiment, a test-taker (e.g., a student) 202 completes a standardized test 204 at a test-taking center (e.g., a school) 206. In this embodiment, the standardized tests include test booklets. Each test booklet includes a number of pages that contain a number of test items or questions.

Completed test booklets are boxed, illustrated at 208, for shipping to a test-processing center 210. The boxes include an identifier 212, such as a bar code for example. Upon arriving at the test-processing center 210, the boxes of test booklets are unloaded at 214. The test booklets are removed from the boxes and sorted at 216. At 220, the test booklets are cut into loose pages. These loose pages are reconciled to ensure that all of the pages for each test booklet are accounted for. Reading devices 222, 224, and 226, such as bar code scanners for example, are used to read the identifiers 223 and identify the boxes, read the identifiers 225 and identify the test booklets, and read the identifiers and identify the pages. In one embodiment, the image field definition system identifies the identifying markings for the pages.

The test pages are graded or scored at 228. In one embodiment, objective scoring tasks, such as multiple choice questions for example, are scored using scoring of tests from images 230. In one embodiment, open-ended scoring tasks are scanned at scanning stations 232, are stored in a queue, and are distributed by a dealer 234 to human readers 235 who evaluate the open-ended scoring tasks. Reports 236 of the score results are provided at 237.

A server in the test-processing center is used to perform a variety of tasks with the scanned data, as discussed herein. In one embodiment, the server includes priority information, as illustrated via lines 238, 240, 242, 244 and 246; the priority information is available at various places along the process. In one embodiment, for example, the reading device(s) 222 determines which of the boxes should proceed for further processing before other boxes. In one embodiment, the reading device(s) 224 determine which of the test booklets should proceed for further processing before other test booklets. In one embodiment, the reading device(s) 226 determine which of the pages (or test items on the pages) should proceed for further processing before other pages (or test items on the pages). In one embodiment, for example, the priority information is used in the scoring system 228 to determine which test items should be scored before other test items. In one embodiment, for example, the priority information is used to determine which reports should be provided before other reports 236.

This application is intended to cover adaptations and variations of the present subject matter. It is to be understood that the above description is intended to be illustrative, and not restrictive. The scope of the present subject matter should be determined with reference to the appended claim, along with the full scope of legal equivalents to which the claims are entitled.

We claim:

1. A method, comprising:
providing a graphical operating interface for controlling a plurality of applications for batch processing of standardized test results in a standardized test imaging system;
receiving a request from a user for controlling processing of the standardized test results using the interface;
processing the standardized test results in a plurality of batches using a computer, wherein each batch comprises a plurality of documents;
creating a database of results from the processing of the standardized test results, wherein each batch is associated with a batch code, wherein each document in each batch is associated with a material code and a return-type code, wherein each document in a batch is assigned a prioritization strength as a function of the material code and the return-type code, wherein each batch is assigned a prioritization strength as a function of the prioritization strengths of the documents in the batch; and
processing the batches based on the prioritization strength of the batches;
wherein the interface provides monitoring and reporting of status of at least one of the applications, wherein the interface provides a depiction of the prioritization of at least one of the batches, and wherein the interface provides one or more of initiating, stopping or pausing the at least one application.

2. The method of claim 1, comprising using the interface to select a server from a plurality of servers to perform the processing.

3. The method of claim 1, wherein the plurality of applications includes a scan quality exporter application.

4. The method of claim 1, wherein the plurality of applications includes an image mark recognition scoring engine (IMRSE) application.

5. The method of claim 1, wherein the plurality of applications includes an instance build application.

6. The method of claim 1, wherein the plurality of applications includes a calibration facilitator application.

7. The method of claim 1, wherein the plurality of applications includes a image purge and archive application.

8. The method of claim 1, wherein creating the database includes associating a batch code with a batch of documents.

9. The method of claim 8, wherein creating the database includes associating a material code with each document of the batch.

10. The method of claim 9, wherein creating the database includes associating a return-type code with each document of the batch.

11. The method of claim 10, wherein creating the database includes automatically assigning a prioritization strength to each document based on the material code and the return-type code.

12. The method of claim 11, wherein creating the database includes storing the batch as a function of the prioritization strength.

13. A method, comprising:
  providing a graphical operating interface for controlling a plurality of applications for batch processing of standardized test results;
  receiving a request from a user for controlling processing of the standardized test results using the interface;
  processing the standardized test results in a plurality of batches using a computer; and
  creating a database of results from the processing,
  wherein the interface provides monitoring of prioritization of each batch and monitoring and reporting of status of at least one of the applications and wherein the interface provides one or more of initiating, stopping or pausing the at least one application, and
  wherein creating the database includes:
    associating a batch code with a batch of documents;
    associating a material code with each document of the batch;
    associating a return-type code with each document of the batch;
    automatically assigning a prioritization strength to each document based on the material code and the return-type code; and
    storing the batch as a function of the prioritization strength,
  wherein the interface provides a depiction of the prioritization of at least one batch.

14. The method of claim 13, wherein creating the database further includes:
  assigning a prioritization strength to the batch as a function of the prioritization strength of at least one document in the batch.

15. The method of claim 13, wherein creating the database further includes:
  assigning a prioritization strength to the batch as a function of the prioritization strength of each document in the batch.

16. The method of claim 13, wherein the interface provides resetting a batch from a step in processing to any previous step in processing.

17. The method of claim 13, wherein each batch includes a date code.

18. The method of claim 17, wherein batches of equal prioritization strength are processed by date code.

19. The method of claim 13, comprising using the interface to select a server from a plurality of servers to perform the processing.

20. The method of claim 13, comprising processing the batch using a computer as a function of the prioritization strength of the batch.

21. A method, comprising:
  providing a graphical operating interface for controlling a plurality of applications for batch processing of standardized test results in a standardized test imaging system;
  receiving a request from a user for controlling processing of the standardized test results using the interface;
  processing a plurality of batches of standardized test results according to a prioritization strength for each batch using a computer, wherein each batch comprises a plurality of documents, wherein each batch is associated with a batch code, wherein each document in each batch is associated with a material code and a return-type code, wherein each document in a batch is assigned a prioritization strength as a function of the material code and the return-type code, wherein each batch is assigned a prioritization strength as a function of the prioritization strengths of the documents in the batch; and
  creating a database of results from the processing,
  wherein the interface provides monitoring and reporting of status of at least one of the applications, wherein the interface provides a depiction of prioritization of at least one of the batches, and wherein the interface provides one or more of initiating, stopping or pausing the at least one application.

* * * * *